US010904097B2

(12) United States Patent
She et al.

(10) Patent No.: US 10,904,097 B2
(45) Date of Patent: Jan. 26, 2021

(54) CONCURRENT NETWORK REFORMATION FOR LOW-POWER AND LOSSY NETWORKS

(71) Applicant: Cisco Technology, Inc., San Jose, CA (US)

(72) Inventors: Huimin She, Shanghai (CN); Li Zhao, Shanghai (CN); Nan Yi, Shanghai (CN); Haibo Dong, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 132 days.

(21) Appl. No.: 16/353,137

(22) Filed: Mar. 14, 2019

(65) Prior Publication Data

US 2020/0296001 A1  Sep. 17, 2020

(51) Int. Cl.
*H04L 12/24* (2006.01)
*H04L 12/44* (2006.01)
*H04L 12/703* (2013.01)
*H04L 29/12* (2006.01)
*H04L 12/751* (2013.01)

(52) U.S. Cl.
CPC .............. *H04L 41/12* (2013.01); *H04L 12/44* (2013.01); *H04L 41/0668* (2013.01); *H04L 41/0816* (2013.01); *H04L 45/02* (2013.01); *H04L 45/28* (2013.01); *H04L 61/2015* (2013.01)

(58) Field of Classification Search
CPC ..... H04L 45/28; H04L 45/02; H04L 43/0817; H04L 43/0852; H04L 41/12; H04W 28/02; H04W 28/0231; H04W 24/04; H04W 52/00
See application file for complete search history.

(56) References Cited

U.S. PATENT DOCUMENTS

| 8,681,674 | B2 | 3/2014 | Berenberg et al. |
| 9,118,539 | B2 | 8/2015 | Vasseur et al. |
| 9,785,509 | B2 | 10/2017 | Hui et al. |
| 9,955,456 | B2 | 4/2018 | Hui et al. |
| 10,412,010 | B1 | 9/2019 | Thubert et al. |
| 2012/0324273 | A1* | 12/2012 | Shaffer ................... H04L 45/28 714/4.12 |

(Continued)

OTHER PUBLICATIONS

"Release Notes for Cisco Resilient Mesh Release 5.6.21", https://www.cisco.com/c/en/us/td/docs/routers/connectedgrid/modules/release_notes/b_cgmesh_rn_5_6.html, 9 pages, 2018, Cisco.

(Continued)

*Primary Examiner* — Backhean Tiv
*Assistant Examiner* — Joseph M Cousins
(74) *Attorney, Agent, or Firm* — Behmke Innovation Group; Kenneth J. Heywood; Jonathon P. Western (57) ABSTRACT

In one embodiment, a device in a mesh network rooted at a root node receives a subroot selection notification. The subroot selection notification indicates that the device should function as a root of a sub-directed acyclic graph (DAG) were a power outage to occur. The device determines that a power outage has occurred. The device forms, after determining that a power outage has occurred, a sub-DAG that is rooted at the device by establishing one or more other devices in the mesh network as routing children of the device in the sub-DAG. The device joins the sub-DAG to a DAG rooted at the root node.

20 Claims, 10 Drawing Sheets

(56) References Cited

U.S. PATENT DOCUMENTS

| | | | |
|---|---|---|---|
| 2013/0010615 A1* | 1/2013 | Hui | H04L 41/0823 370/252 |
| 2013/0281022 A1 | 10/2013 | Mahany et al. | |
| 2014/0325182 A1* | 10/2014 | Varakur | G06F 11/0709 712/30 |
| 2016/0132397 A1* | 5/2016 | Hui | G06F 11/1415 714/4.11 |
| 2016/0249400 A1 | 8/2016 | Somasandharam et al. | |

OTHER PUBLICATIONS

Winter et al., "RPL: IPv6 Routing Protocol for Low-Power and Lossy Networks", Internet Engineering Task Force (IETF), Standards Track, Mar. 2012, 157 pages.

Vasseur et al., "Routing Metrics Used for Path Calculation in Low-Power and Lossy Networks", Internet Engineering Task Force (IETF), Standards Track, Mar. 2012, 30 pages.

Thubert, "Objective Function Zero for the Routing Protocol for Low-Power and Lossy Networks (RPL)", Internet Engineering Task Force (IETF), Standards Track, Mar. 2012, 14 pages.

Gnawali et al., "The Minimum Rank with Hysteresis Objective Function", Internet Engineering Task Force (IETF), Standards Track, Sep. 2012, 13 pages.

Heile et al., "Wi-SUN FAN Overview", Internet Engineering Task Force (IETF), Jul. 3, 2017, 10 pages.

\* cited by examiner

CONCURRENT NETWORK REFORMATION FOR LOW-POWER AND LOSSY NETWORKS

TECHNICAL FIELD

The present disclosure relates generally to computer networks, and, more particularly, to concurrent network reformation for Low-Power and Lossy Networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium. However, when a power outage occurs, it can take a considerable amount of time to bring the network back online. Until the network is fully restored, measurements (e.g., meter readings, etc.) from the network cannot be collected.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a mesh network rooted at a root node receives a subroot selection notification. The subroot selection notification indicates that the device should function as a root of a sub-directed acyclic graph (DAG) were a power outage to occur. The device determines that a power outage has occurred. The device forms, after determining that a power outage has occurred, a sub-DAG that is rooted at the device by establishing one or more other devices in the mesh network as routing children of the device in the sub-DAG. The device joins the sub-DAG to a DAG rooted at the root node.

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
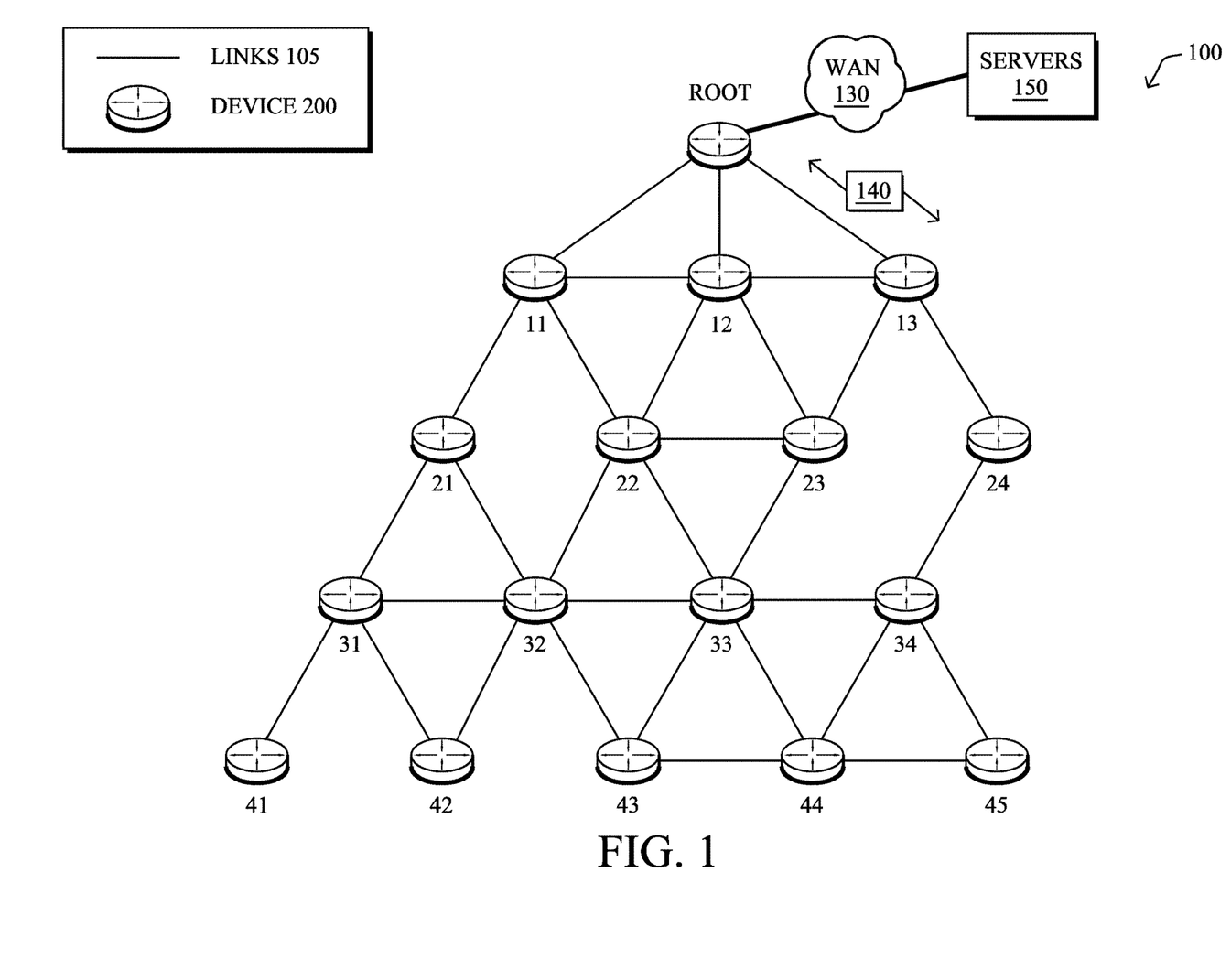
FIG. 1 illustrates an example computer network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
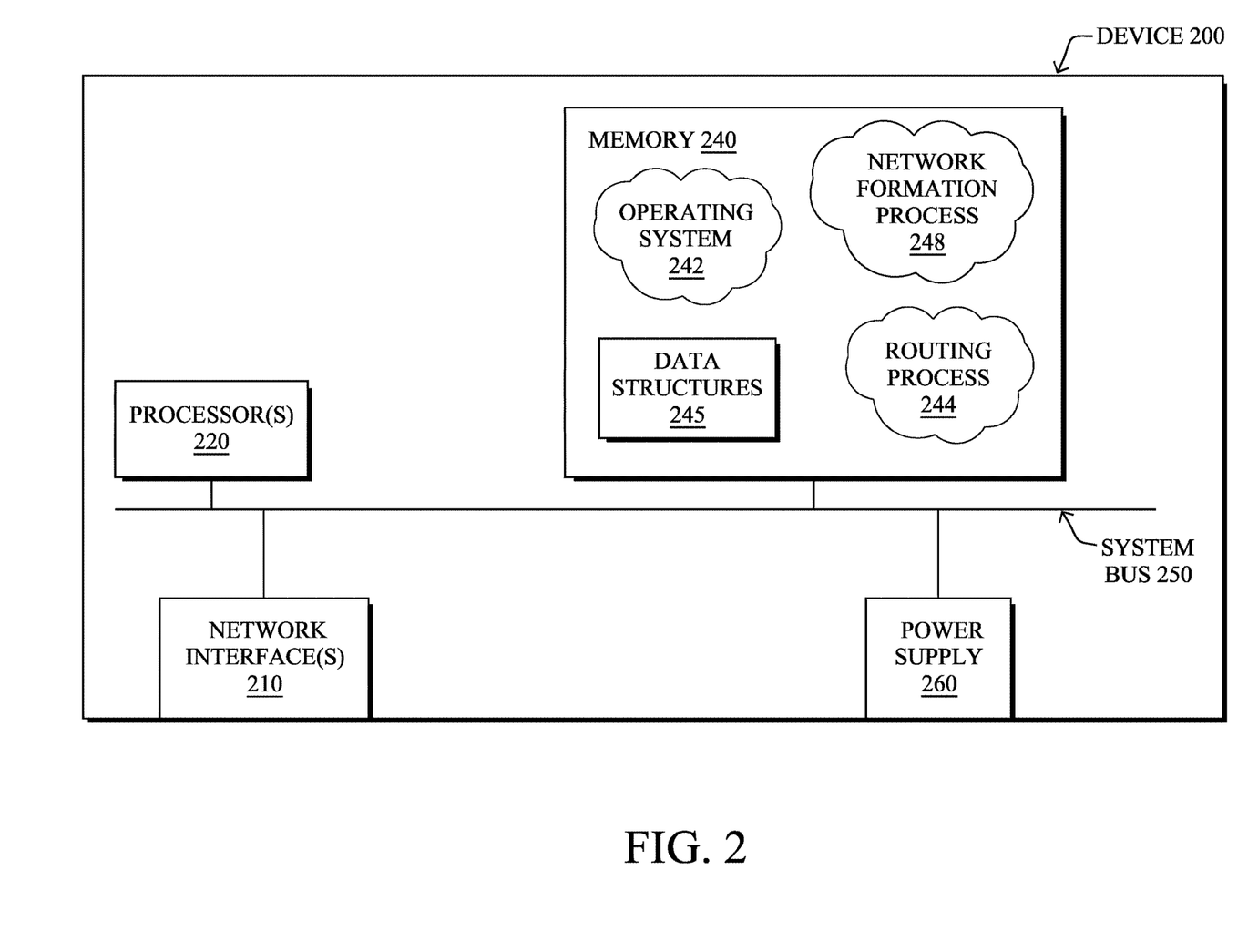
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260 or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative network formation process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by a DAG process) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
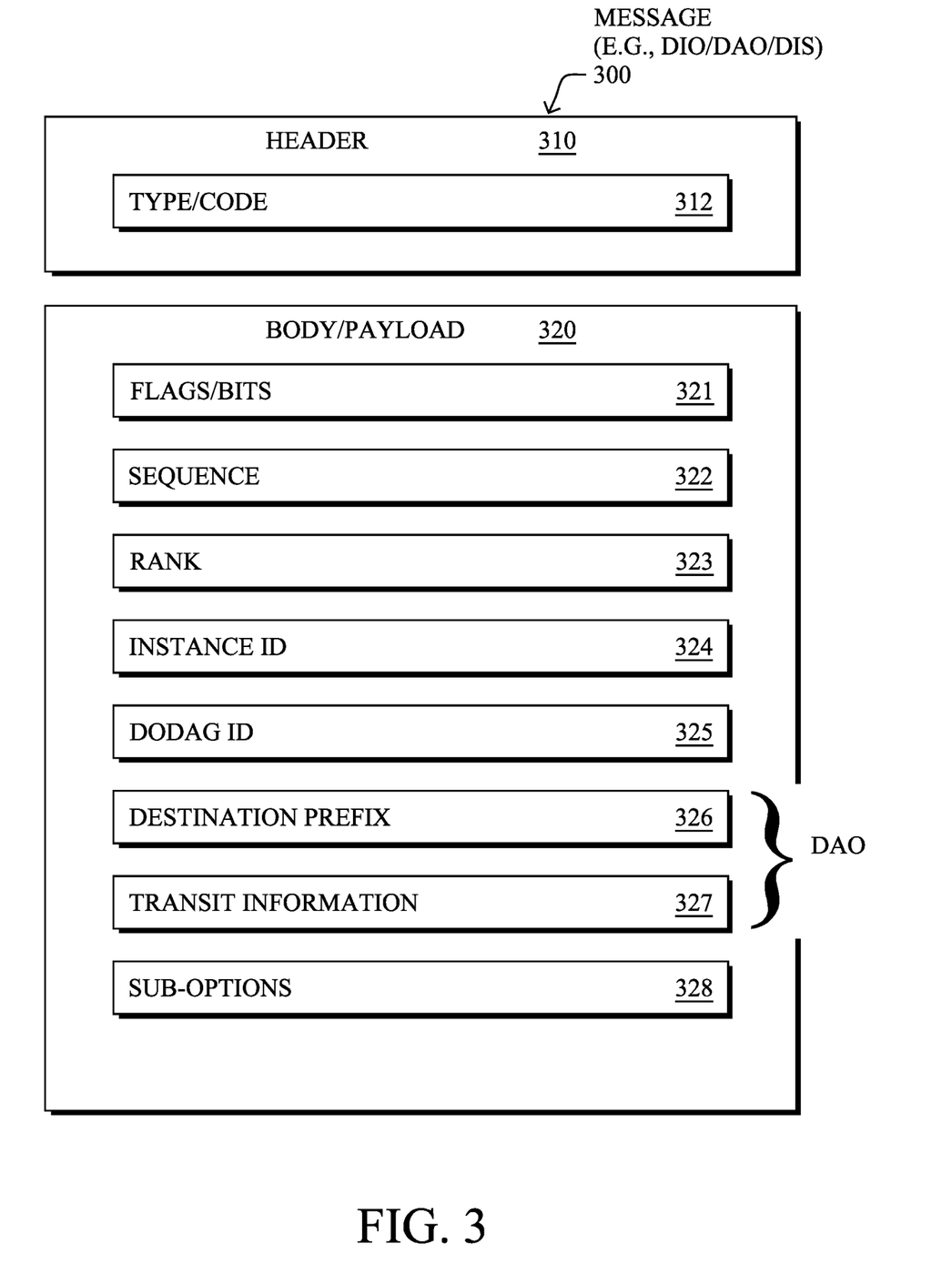
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
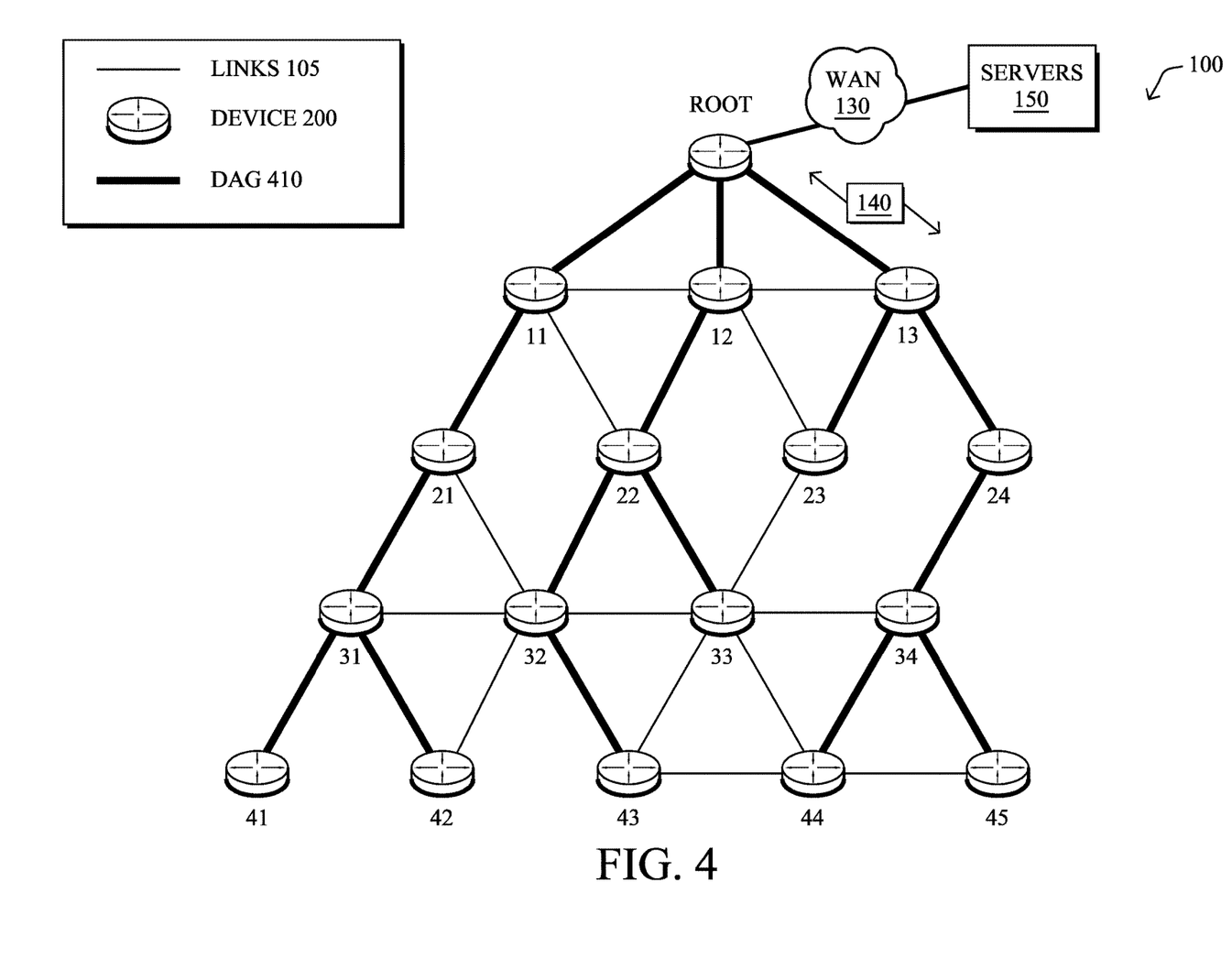
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140, shown previously in FIG. 1, may then traverse the DAG 410 in either the upward direction toward the root or downward toward the leaf nodes, particularly as described herein.

As noted above, power outage events can disrupt the functioning of mesh networks, such as LLNs. In the case of AMI/smart meter implementations, the various nodes/devices in the network may leverage Power Outage Notifications (PONs) and Power Restoration Notifications (PRNs) to report the loss of power and restoration of power in the network. Timely delivery of PONs and PRNs allows a utility to efficiently identify the occurrence of power outages and restorations, and to quickly react to the events. This is essential for optimizing the utility operations, such as recording the power outage duration for future analysis, providing real-time feedback of the fieldwork, and preventing unnecessary truck rolls that may be triggered by PONs.

Unfortunately, the time needed to reform the network after a power outage occurs may be unsatisfactory in many deployments. For example, the requirements of one smart meter deployment may be that 99% or more of the PRNs be delivered within less than fifteen minutes in a multi-hop mesh network with thousands of nodes. However, a typical network deployment may include one Field Area Router (FAR) and thousands of nodes/devices, with each node having potentially hundreds of neighbors. The overall size and complexity of such a network means that reformation of the network will take a considerable amount of time.

Typically, the network (re)formation process entails the following steps:
(1) Personal Area Network (PAN) Selection: A joining node listens for PAN Advertisement (PA) beacons to select a PAN to join.
(2) Authentication: Nodes perform 802.1x mutual authentication and obtain security keys.
(3) PAN Configuration: A joining node listens for PAN Configuration (PC) beacons containing PAN-wide information, such as broadcast schedule, security keys, PAN version, etc.
(4) Routing Formation: A joining node also obtains an IPv6 address and advertises it to the root node, to configure the downward route.

While the above steps are not overly burdensome in smaller networks, requiring each joining node in a larger network to participate in the above steps can add a considerable amount of time to the reformation process after a power outage.

Figure 5:
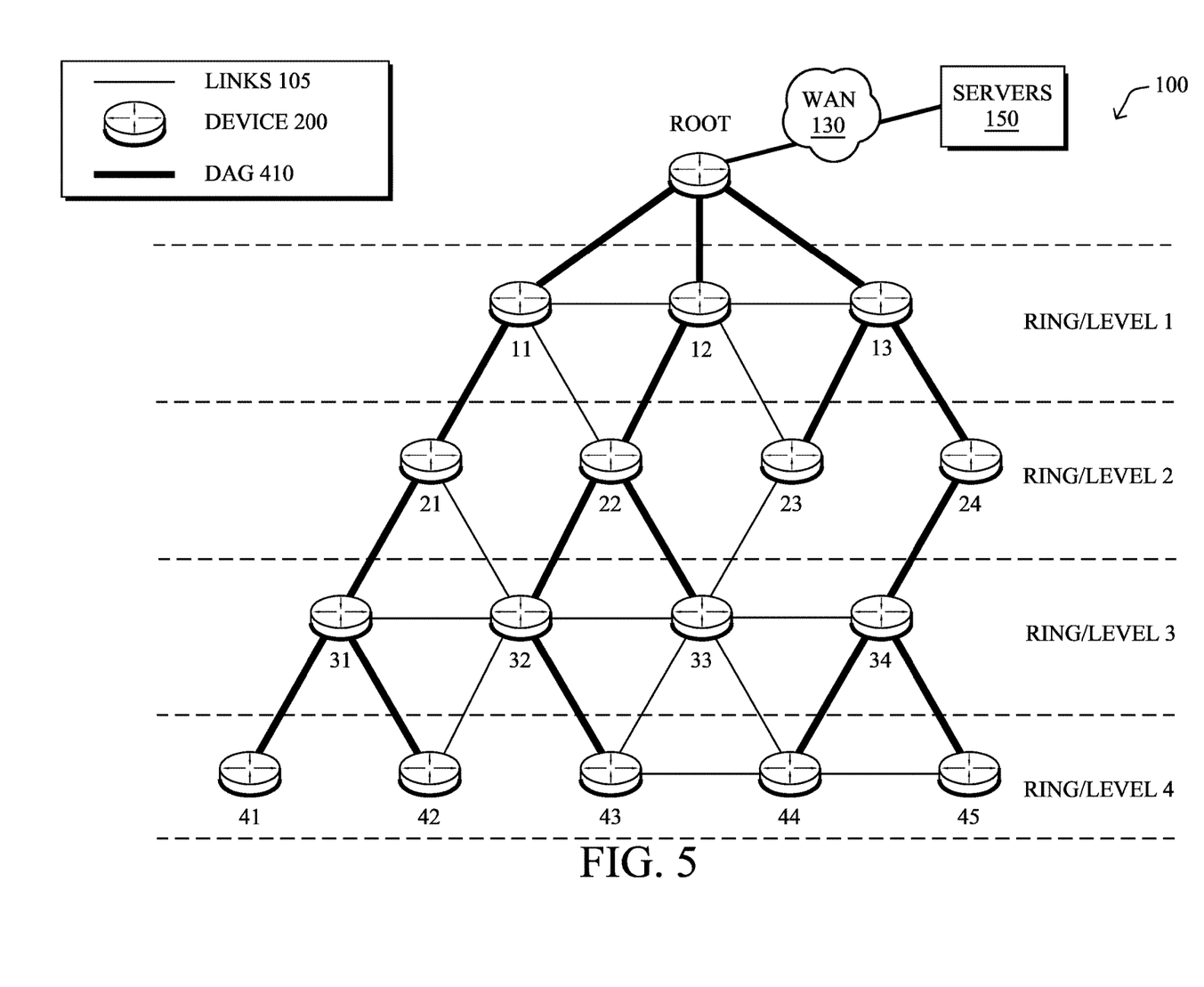
FIG. 5 illustrates an example of rings/levels of a DAG.

In addition to the overhead associated with the above steps, network (re)formation is also typically performed across sequential rings/levels of the network. FIG. 5 illustrates an example of such rings/levels with respect to DAG 410. During (re)formation of the network, devices/nodes 11-13 in Ring/Level 1 may be added to DAG 410 as children of the root node, followed by nodes 21-24 in Ring/Level 2, followed by nodes 31-34 in Ring/Level 3, and so on. In smaller networks with a minimal amount of rings/levels, this approach will have negligible effect on the overall network (re)formation time. However, in larger networks, this approach also means that nodes that are farther away from the root will not be able to rejoin the network until much later, nor report their readings until the do.

Concurrent Network Reformation for Low-Power and Lossy Networks

The techniques herein introduce a concurrent network reformation approach that allows nodes to quickly join a PAN after a power restoration event. In some aspects, a subset of nodes/devices are selected as subroots to construct sub/mini-DAGs after a power outage. In turn, the subroot can store fog computing data temporally and stream it to the root slowly, after joining the sub-DAG to the primary DAG of the network.

Specifically, according to one or more embodiments of the disclosure as described in detail below, a device in a mesh network rooted at a root node receives a subroot selection notification. The subroot selection notification indicates that the device should function as a root of a sub-directed acyclic graph (DAG) were a power outage to occur. The device determines that a power outage has occurred. The device forms, after determining that a power outage has occurred, a sub-DAG that is rooted at the device by establishing one or more other devices in the mesh network as routing children of the device in the sub-DAG. The device joins the sub-DAG to a DAG rooted at the root node.

Illustratively, the techniques described herein may be performed by hardware, software, and/or firmware, such as in accordance with the network formation process 248, which may include computer executable instructions executed by the processor 220 (or independent processor of interfaces 210) to perform functions relating to the techniques described herein, e.g., in conjunction with routing process 244.

Operationally, FIGS. 6A-6D illustrate an example of network reformation after a power outage event, in accordance with the various embodiments herein. In various embodiments, the techniques herein comprise two primary mechanisms: 1.) certain devices/nodes are selected to form sub-DAGs concurrently with the formation of the primary DAG in the network, allowing nodes farther away from the root node to send measurements and sensor readings sooner and accelerate reformation of the network, and 2.) devices/nodes in the network store information in persistent memory (e.g., flash, etc.) that can be used to either skip or expedite the traditional steps involved with (re)joining the network after a power outage.

Figure 6A:
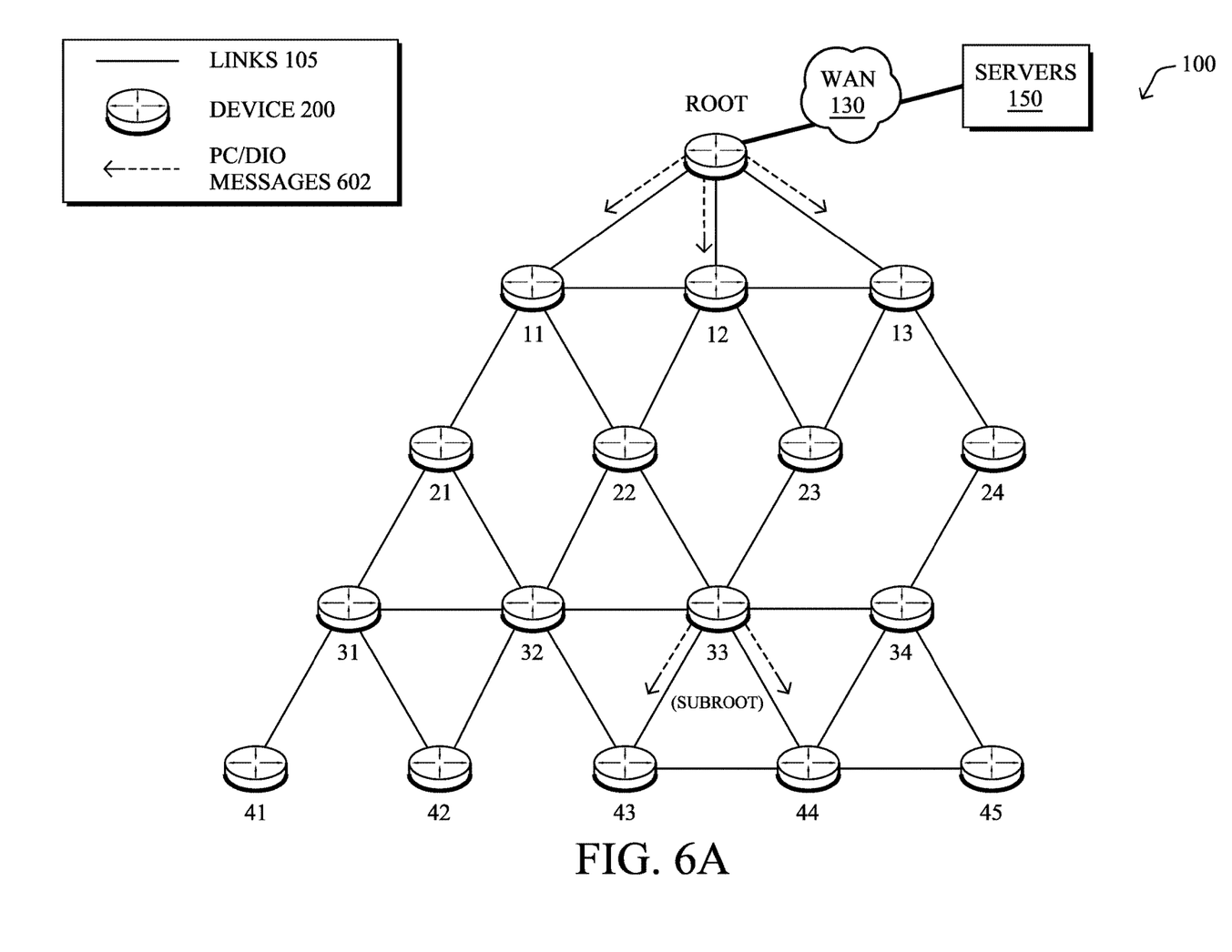
FIGS. 6A-6D illustrate an example of network reformation after a power outage event.

In various embodiments, prior to a power outage, any number of devices/nodes in the network may be selected to function as subroots during reformation of the network. For example, as shown in FIG. 6A, assume that device/node 33 has been selected to perform as a subroot, for purposes of reforming the network after a power outage. Depending on the topology of the network, the selection of a subroot may be based on the rank/level of the selected device in the DAG (e.g., rank 3, 6, 9, etc.). To avoid interrupting reconstruction of the original DAG and hidden terminal problems, the selected subroots are recommended to be at least 3 hops away from the root node of the network.

In one embodiment, the selection of device/node 33 as a subroot may be performed by the border router/root node of the network, or another supervisory device of the network, before the power outage event occurs. In such a case, the root node may send a subroot selection notification to device/node 33 indicating that node/device 33 should function as a subroot immediately after a power outage event, to accelerate reformation of the network. Alternatively, device/node 33 may randomly become a subroot based on its Eui-64 address. In further embodiments, the selection of device/node 33 as a subroot may be based in part on the resources and capabilities of device/node 33. For example, device/node 33 may be selected as a subroot based on its abilities to function as a fog computing node.

As shown in FIG. 6A, assume now that a power outage event has occurred, and that power has been restored to network 100. In such a case, both the root node and subroot 33 may send out PAN configuration (PC) and DIO messages 602, concurrently, to begin reformation of the network. For example, the root node may send messages 602 to its first hop neighbors, nodes/devices 11-13. Similarly, node/device 33 may send messages 602 to nodes/devices 43 and 44.

In some embodiments, the DIO message 602 may include the rank/hop information from before the power outage. Doing so ensures that the network reformation will not go backwards, by causing the node to join the root or subroot closes to the root. It is expected that most In further embodiments, the PC/DIO messages 602 may also be sent by a subroot and/or root node via unicast to the previous children of the node. For example, instead of sending messages 602 asynchronously, node 33 may send PC/DIO messages 602 to nodes 43 and 44 via unicast, to accelerate nodes 43 and 44 rejoining the network. Furthermore, in order to avoid occupying bandwidth of rebuilding the DAG, subroots should have a low-priority when building sub-DAGs. For example, subroot 33 should not advertise DIO messages 602 when its parent or grandparent are advertising them.

To further expedite network reformation after the power outage, a node/device in the network may store any or all of the following information in persistent memory:
  A PAN identifier for the PAN (PANID)
  Security key information (e.g., one or more security keys)
  Eui64 addresses of the preferred parent of the node
  Rank/hop information
  The IPv6 address of the node/device
  A DAG identifier (e.g., a DODAG ID)

By storing PANID, a joining node may skip the PAN selection state, meaning that the node does not need to send and receive discovery beacons, to rejoin the network. Similarly, by storing security key information, the node does not need to exchange key information for authentication purposes. Additionally, storing the IPv6 address used by the node prior to the power outage allows the node to skip the DHCP process typically performed when a node joins the network.

Figure 6B:
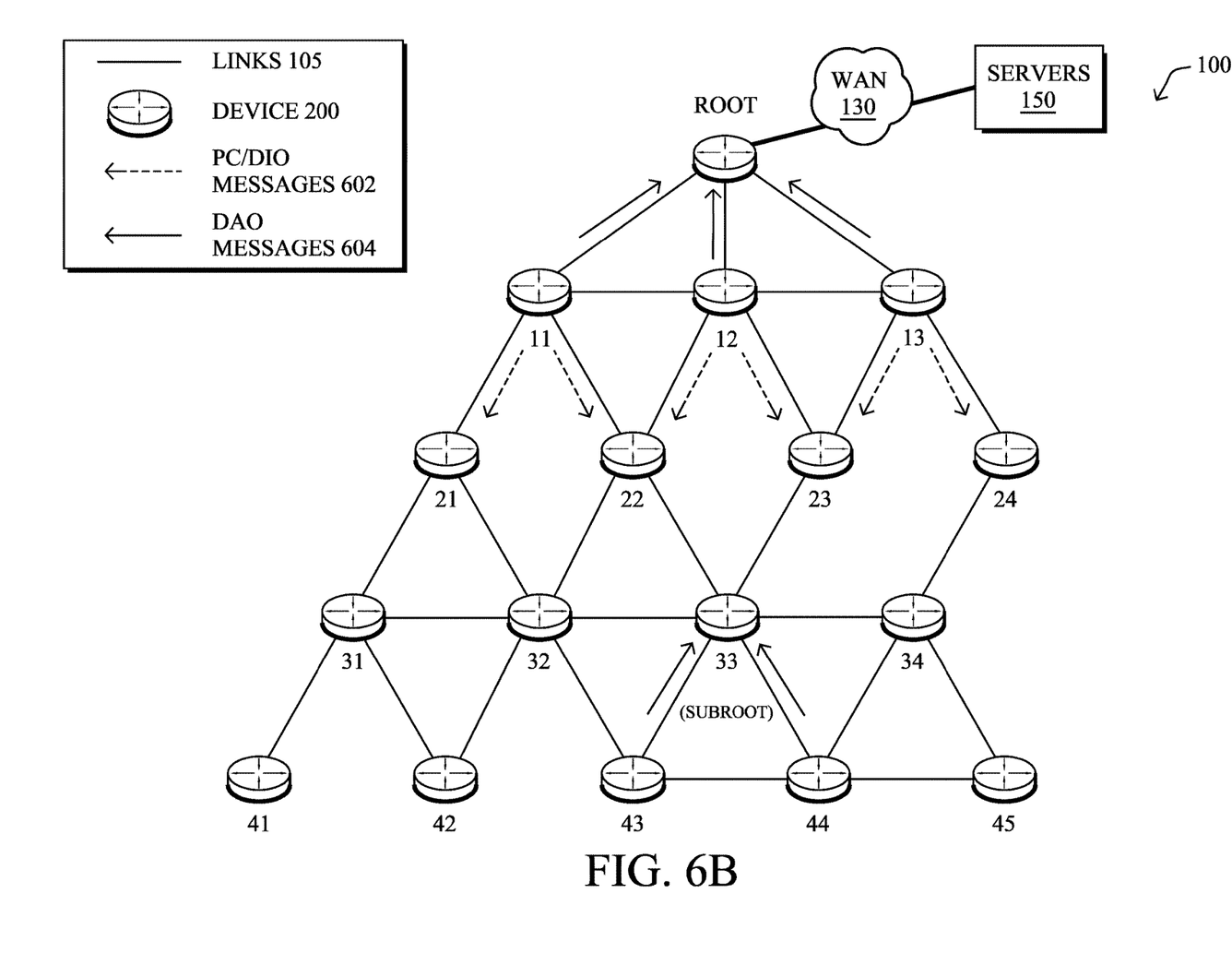
Figure 6C:
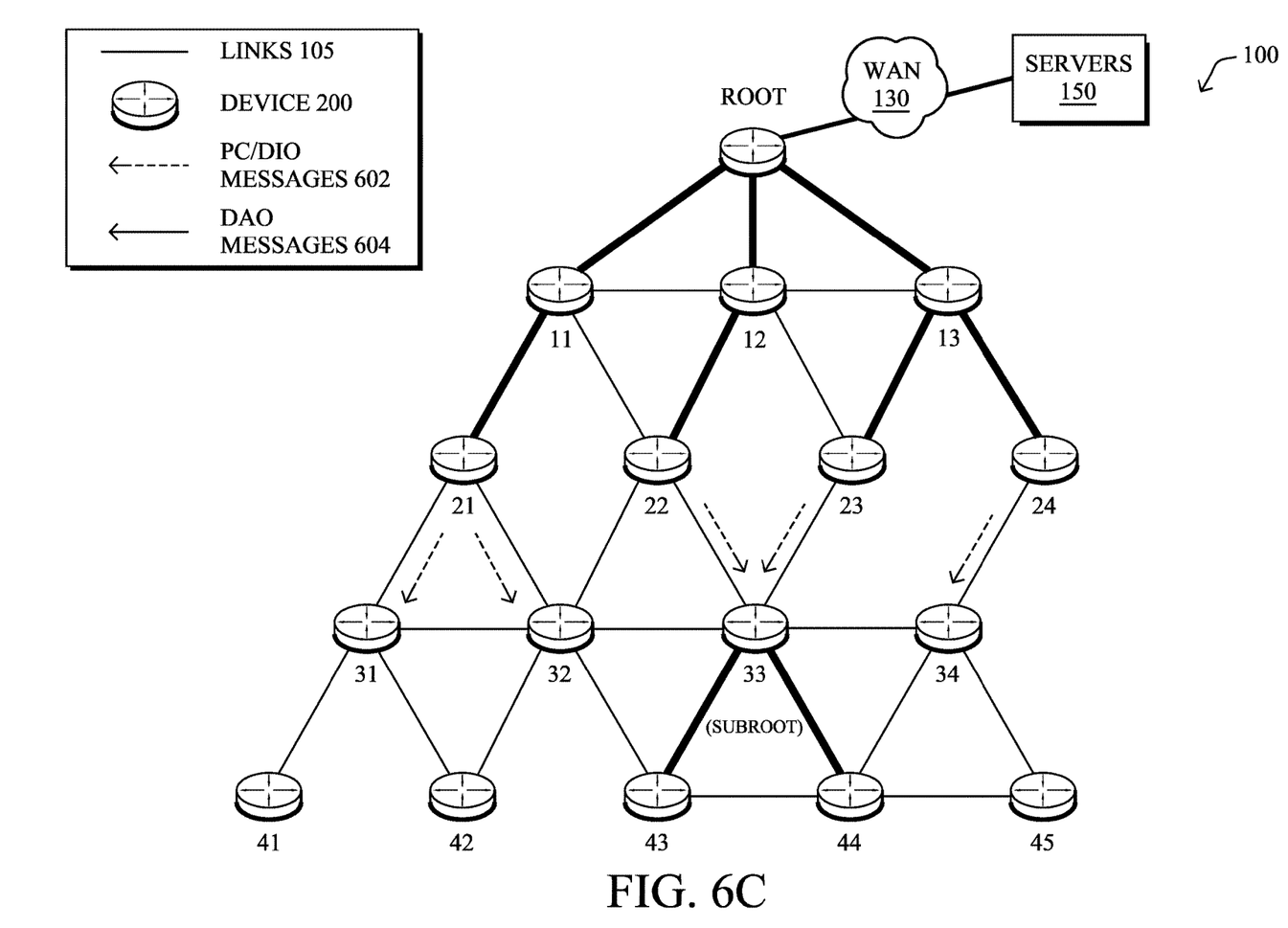

In FIG. 6B, the recipients of PC/DIO messages 602 may respond with DAO messages 604 and, in turn, send out their own PC/DIO messages 602 to their nearby nodes. As shown in FIG. 6C, this effective results in two DAGs: the primary DAG rooted at the root node and a sub-DAG rooted at subroot/device 33.

In some embodiments, once nodes 43-44 have joined the sub-DAG rooted at device/node 33, they may send their sensor data (e.g., meter readings, etc.) and/or PRNs to device 33 for further processing. For example, node 33 may gather this data and send it onward to the root node, as soon as it joins the primary DAG. Node 33 may also throttle the reporting of the collected information, so as not to overload the network.

Figure 6D:
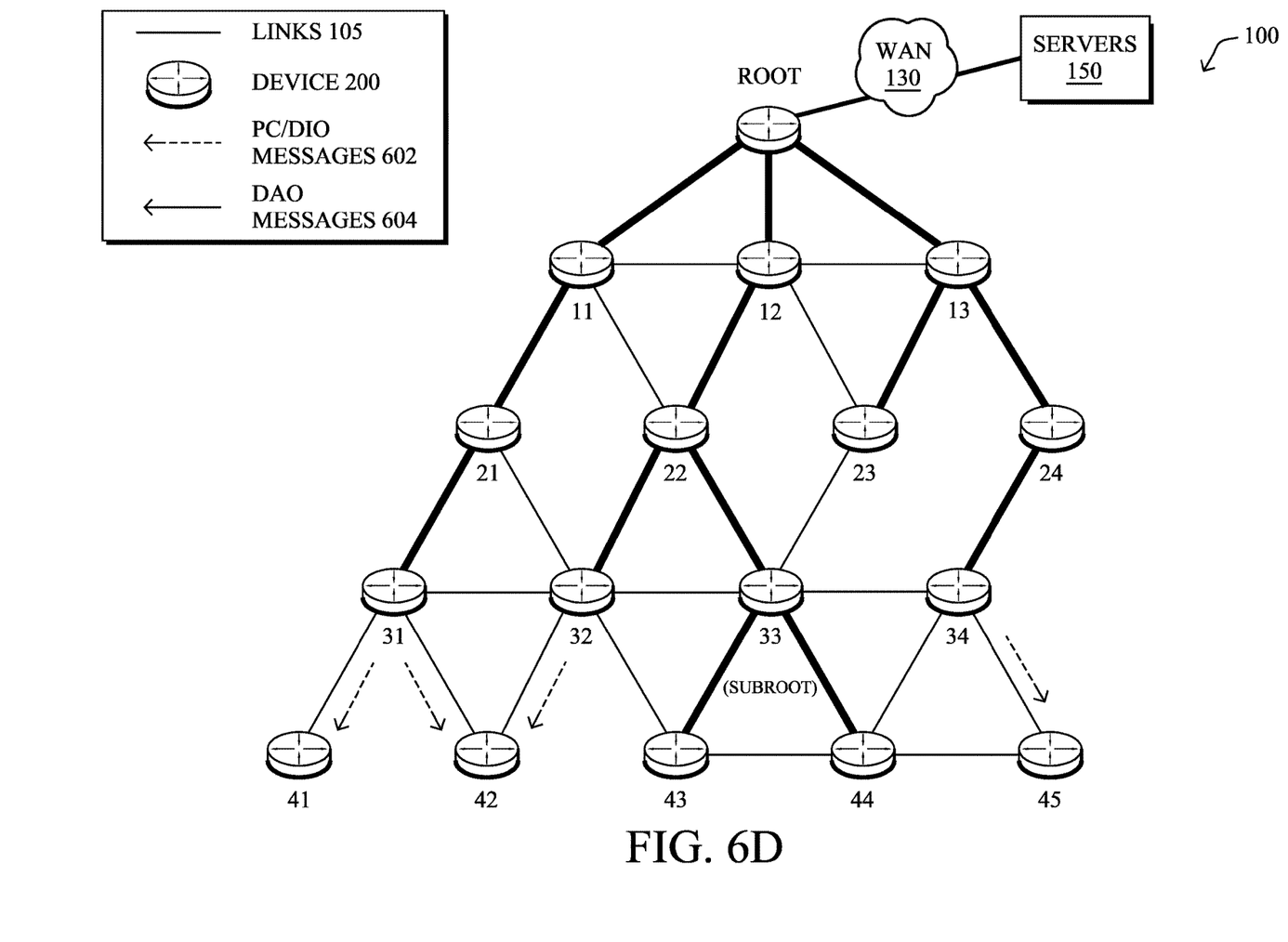

After forming a sub-DAG with nodes 43-44, node/device 33 may receive PC/DIO messages 602 from its previous parent node, node 22. In turn, node 33 may respond with a DAO message 604, thereby stitching the sub-DAG to the primary DAG rooted at the root node. Thus, as shown in FIG. 6D, both node 33, as well as its children, nodes 43-44, have been rejoined to the primary DAG rooted at the root node and it may return to being a normal network node instead of a subroot. If node 33 has stored any sensor data, PRNs, etc. on behalf of nodes 43-44, it may also begin sending this data onward to the root node.

Figure 7:
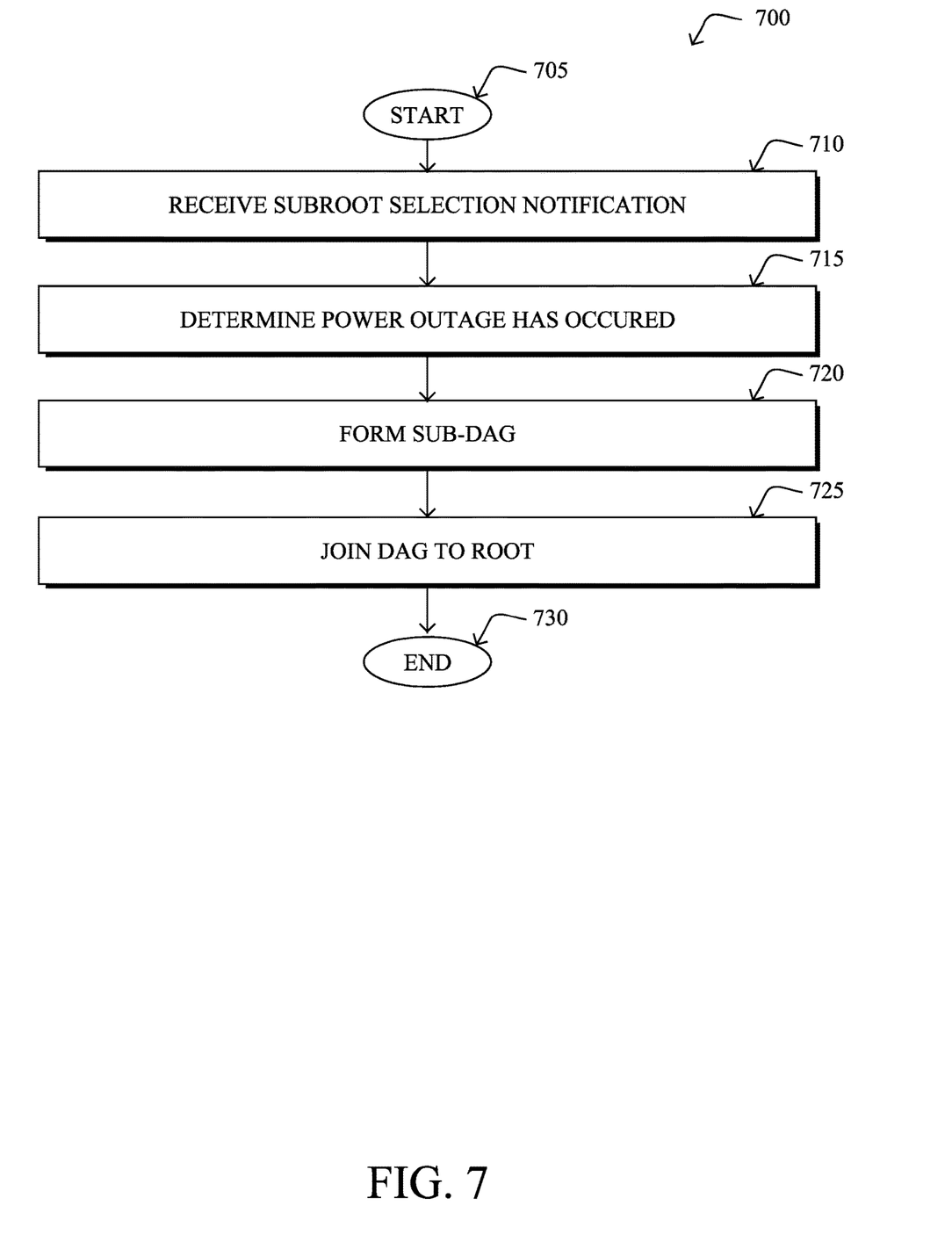
FIG. 7 illustrates an example simplified procedure for concurrent network reformation.

FIG. 7 illustrates an example simplified procedure for concurrent network reformation in a network, in accordance with one or more embodiments described herein. For example, a non-generic, specifically configured node/device (e.g., device 200) in a mesh network (e.g., an LLN) may perform procedure 700 by executing stored instructions (e.g., processes 244, 248). The procedure 700 may start at step 705, and continues to step 710, where, as described in greater detail above, the device may receive a subroot selection notification that indicates that the device should function as a root of a sub-directed acyclic graph (DAG) were a power outage to occur. For example, the device may receive the notification from the root node of the network or another supervisory device based on the location of the device in the network (e.g., number of hops to the root node), the capabilities of the device (e.g., whether the device can function as a fog computing node), and/or any other factors, as desired.

At step 715, as detailed above, the device may determine that a power outage has occurred. For example, if the device is a smart meter, it may monitor the power supplied by the grid to detect a power outage event.

At step 720, the device may form, after determining that a power outage has occurred, a sub-DAG that is rooted at the device, as described in greater detail above. In various embodiments, the device may do so by establishing one or more other devices in the mesh network as routing children of the device in the sub-DAG. For example, the device may send PC and DIO messages to one or more other devices after the power outage, to form a sub-DAG rooted at the device. In some embodiments, the device may send these messages via unicast to the one or more other devices. In addition, in various embodiments, the device may send these messages concurrently with the root node of the network sending similar messages to its nearby nodes/devices. In this manner, nodes that are close to the root node can join the primary DAG, while farther away nodes/devices can join the sub-DAG rooted at the device.

At step 725, as detailed above, the device may join the sub-DAG to a DAG rooted at the root node. Notably, after some period of time has elapsed, the device will receive PC/DIO messages from a member of the DAG and join the DAG as a child of that member. In various embodiments, the device may also store, prior to the power outage occurring, at least one of: personal area network (PAN) identifier information, IPv6 address information, security key information, rank or hop information for the DAG, DAG identifier information, or Eui64 address information for a preferred parent of the apparatus in the DAG. Such information can be leveraged by the device after restoration of the power, to expedite joining the DAG to the root node. For example, the device could use the stored PAN identifier information to skip sending and receiving discovery beacons for the PAN, use the stored IPv6 address to avoid sending a DHCP request, use the security key information to facilitate authentication with its parent, etc. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for much faster network reformation after a power outage event, over existing approaches. In some aspects, a node/device can be designated as a subroot that forms a sub-DAG concurrently with the root of the network forming a DAG. Doing so allows nodes that are farther away from the root node to join the network faster. In further aspects, the techniques herein also propose that nodes/devices in the network store certain information in persistent memory that can be used after a power outage event, to avoid performance of the typical steps involved when joining the network, such as PAN selection, key exchange, obtaining an address via DHCP, etc.

While there have been shown and described illustrative embodiments that provide for the concurrent network reformation of LLNs and other forms of networks, it is to be understood that various other adaptations and modifications may be made within the spirit and scope of the embodiments herein. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device in a mesh network rooted at a root node, a subroot selection notification, wherein the subroot selection notification indicates that the device should function as a root of a sub-directed acyclic graph (DAG) were a power outage to occur;
   determining, by the device, that a power outage has occurred;
   forming, by the device and after determining that the power outage has occurred, a sub-DAG that is rooted at the device by establishing one or more other devices in the mesh network as routing children of the device in the sub-DAG; and
   joining, by the device, the sub-DAG to a DAG rooted at the root node.

2. The method as in claim 1, wherein the device receives the subroot selection notification from the root node.

3. The method as in claim 1, wherein joining the sub-DAG to the DAG rooted at the root node comprises: using a personal area network (PAN) identifier stored by the device to skip sending and receiving discovery beacons with a member of the DAG; and joining the DAG as a child of the member.

4. The method as in claim 1, wherein forming the sub-DAG comprises: sending a personal area network (PAN) configuration and a DAG Information 3 Object (DIO) message as unicast messages to the one or more other devices.

5. The method as in claim 4, wherein the device sends the PAN configuration and the DIO message to the one or more other devices concurrently with the root node also sending a PAN configuration and DIO message to one or more devices.

6. The method as in claim 5, wherein the DIO message sent by the root node includes rank or hop information for the DAG from prior to the power outage occurring.

7. The method as in claim 1, wherein joining the sub-DAG to the DAG rooted at the root node comprises: using security keys stored by the device to facilitate authentication with a member of the DAG; and joining the DAG as a child of the member.

8. The method as in claim 1, wherein joining the sub-DAG to the DAG rooted at the root node comprises: using an Internet Protocol version 6 (IPv6) address stored by the device to skip sending a Dynamic Host Configuration Protocol (DHCP) request, when joining a member of the DAG as a child of the member.

9. The method as in claim 1, further comprising: receiving, at the device and prior to joining the DAG rooted at the root node, sensor data from the one or more routing children of the device in the sub-DAG; 4 and sending, by the device, the sensor data to the root node, after joining the sub-DAG to the DAG rooted at the root node.

10. The method as in claim 1, further comprising: storing, by the device and prior to the power outage occurring, at least one of: rank or hop information for the DAG, DAG identifier information, or Eui64 address information for a preferred parent of the device in the DAG; and using the stored information to facilitate joining of the device to the DAG.

11. A tangible, non-transitory, computer-readable medium having software encoded thereon, the software when executed by a device in a mesh network rooted at a root node operable to:
  receiving, at the device, a subroot selection notification, wherein the subroot selection notification indicates that the device should function as a root of a sub-directed acyclic graph (DAG) were a power outage to occur;
  determining, by the device, that a power outage has occurred;
  forming, by the device and after determining that the power outage has occurred, a sub-DAG that is rooted at the device by establishing one or more other devices in the mesh network as routing children of the device in the sub-DAG; and
  joining, by the device, the sub-DAG to a DAG rooted at the root node.

12. The computer-readable medium as in claim 11, wherein forming the sub-DAG 2 comprises: sending a personal area network (PAN) configuration and a DAG Information Object (DIO) message as unicast messages to the one or more other devices.

13. An apparatus, comprising:
  one or more network interfaces to communicate with a mesh network rooted at a root node;
  a processor coupled to the network interfaces and configured to execute one or more processes; and
  a memory configured to store a process executable by the processor, the process when executed operable to:
  receive a subroot selection notification, wherein the subroot selection notification indicates that the apparatus should function as a root of a sub-directed acyclic graph (DAG) were a power outage to occur;
  determine that a power outage has occurred;
  form, after determining that the power outage has occurred, a sub-DAG that is rooted at the apparatus by establishing one or more devices in the mesh network as routing children of the apparatus in the sub-DAG; and
  join the sub-DAG to a DAG rooted at the root node.

14. The apparatus as in claim 13, wherein the apparatus receives the subroot selection notification from the root node.

15. The apparatus as in claim 13, wherein the apparatus forms the sub-DAG by: sending a personal area network (PAN) configuration and a DAG Information Object (DIO) message as unicast messages to the one or more devices.

16. The apparatus as in claim 15, wherein the apparatus sends the PAN configuration and the DIO message to the one or more devices concurrently with the root node also sending a PAN configuration and DIO message to one or more devices.

17. The apparatus as in claim 16, wherein the DIO message sent by the root node includes rank or hop information for the DAG from prior to the power outage occurring.

18. The apparatus as in claim 13, wherein the apparatus joins the sub-DAG to the DAG rooted at the root node by: using an Internet Protocol version 6 (IPv6) address stored by the apparatus to skip sending a Dynamic Host Configuration Protocol (DHCP) request, when joining the DAG as a child of the member.

19. The apparatus as in claim 13, wherein the process when executed is further configured to: receive, prior to joining the DAG rooted at the root node, sensor data from the one or more routing children of the apparatus in the sub-DAG; and send the sensor data to the root node, after joining the sub-DAG to the DAG rooted at the root node.

20. The apparatus as in claim 13, wherein the process when executed is further configured to: store, prior to the power outage occurring, at least one of: personal area network (PAN) identifier information, security key information, rank or hop information for the DAG, DAG identifier information, or Eui64 address information for a preferred parent of the apparatus in the DAG; and using the stored information to facilitate joining of the apparatus to the DAG.

* * * * *